United States Patent
Nagata et al.

(10) Patent No.: US 9,694,724 B2
(45) Date of Patent: Jul. 4, 2017

(54) VEHICULAR SEAT SLIDE DEVICE

(71) Applicant: AISIN SEIKI KABUSHIKI KAISHA, Kariya-shi (JP)

(72) Inventors: Toshiaki Nagata, Chita-gun (JP); Hiroyuki Okazaki, Chiryu (JP); Kenji Tatewaki, Anjo (JP); Yuki Kuroda, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/689,465

(22) Filed: Apr. 17, 2015

(65) Prior Publication Data
US 2015/0298581 A1 Oct. 22, 2015

(30) Foreign Application Priority Data

Apr. 18, 2014 (JP) ................................. 2014-086858

(51) Int. Cl.
*F16M 13/00* (2006.01)
*B60N 2/42* (2006.01)
*B60N 2/02* (2006.01)
*B60N 2/06* (2006.01)
*F16H 25/24* (2006.01)

(52) U.S. Cl.
CPC .............. *B60N 2/43* (2013.01); *B60N 2/0232* (2013.01); *B60N 2/067* (2013.01); *B60N 2205/20* (2013.01); *F16H 2025/2445* (2013.01)

(58) Field of Classification Search
CPC .................. B60N 2/067; B60N 2/0232; F16H 2025/2445; Y10T 74/1868

USPC ...................... 248/429, 422, 424; 296/65.15; 297/344.1
See application file for complete search history.

(56) References Cited

U.S. PATENT DOCUMENTS 2,215,107 A * 9/1940 Mulka ..................... F16H 25/24
74/424.75
4,729,703 A * 3/1988 Sato ....................... F16B 31/021
411/237

(Continued)

FOREIGN PATENT DOCUMENTS

CN 203930307 U * 11/2014
DE 39 19 378 A1 12/1989

(Continued)

OTHER PUBLICATIONS

Extended European Search Report issued Sep. 21, 2015 in Patent Application No. 15164061.2.

*Primary Examiner* — Kimberly Wood
(74) *Attorney, Agent, or Firm* — Oblon, McClelland, Maier & Neustadt, L.L.P.

(57) ABSTRACT

A vehicular seat slide device, includes: a first rail fixed to one of a vehicular floor and a seat; a second rail fixed to the other one of the floor and the seat, and linked to be movable relative to the first rail; a screw rod supported by the second rail to be rotatable around an axial line which extends in a moving direction; a metal case fixed to the first rail, and through which the screw rod is inserted; a resin nut housed in the metal case in a state of being unmovable in the moving direction with respect to the metal case, and screwed to the screw rod; and a metal nut housed in the metal case in a state of not being in contact with the resin nut in the moving direction, and screwed to the screw rod.

2 Claims, 4 Drawing Sheets

(56) References Cited

U.S. PATENT DOCUMENTS

| | | | | |
|---|---|---|---|---|
| 4,872,903 | A | * | 10/1989 | Periou .................... B60N 2/067 254/102 |
| 5,048,786 | A | * | 9/1991 | Tanaka ................... B60N 2/067 248/429 |
| 5,333,905 | A | * | 8/1994 | Watanabe ............. B60R 22/201 280/801.1 |
| 5,797,293 | A | * | 8/1998 | Chaban ................ B60N 2/0232 248/429 |
| 5,816,555 | A | * | 10/1998 | Ito ......................... B60N 2/067 248/424 |
| 5,860,319 | A | * | 1/1999 | Via ...................... B60N 2/0232 248/429 |
| 6,971,620 | B2 | * | 12/2005 | Moradell ............... B60N 2/067 248/422 |
| 2003/0173809 | A1 | | 9/2003 | Moradell et al. |
| 2009/0243327 | A1 | * | 10/2009 | Koga .................... B60N 2/067 296/65.15 |
| 2010/0044542 | A1 | * | 2/2010 | Koga .................... B60N 2/067 248/429 |
| 2010/0065708 | A1 | * | 3/2010 | Koga .................... B60N 2/067 248/429 |
| 2011/0308340 | A1 | | 12/2011 | Bosecker et al. |

FOREIGN PATENT DOCUMENTS

| | | | |
|---|---|---|---|
| EP | 2 070 761 A2 | | 6/2009 |
| JP | 2008222034 A | * | 9/2008 |
| JP | 2009-090941 | | 4/2009 |
| JP | 5411459 | | 2/2014 |

* cited by examiner

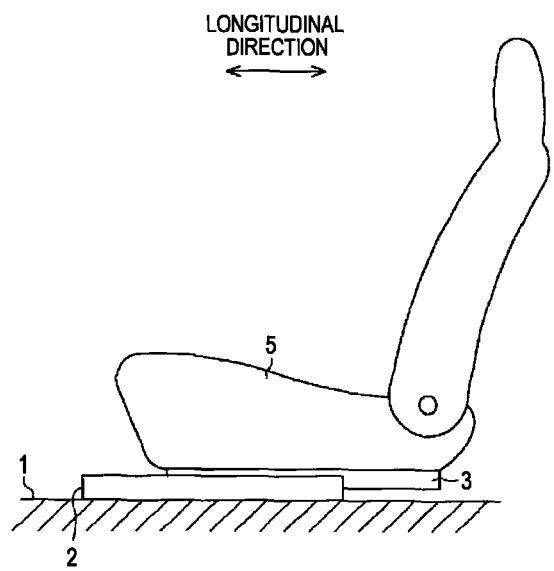
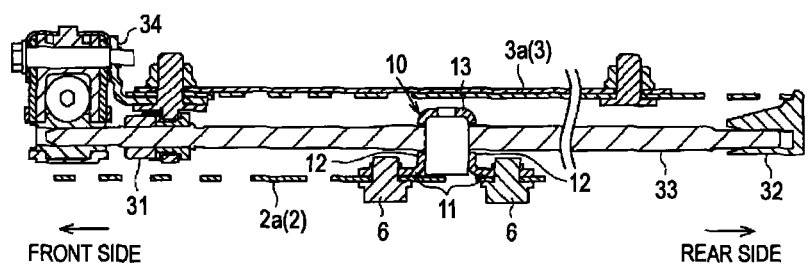

VEHICULAR SEAT SLIDE DEVICE

CROSS REFERENCE TO RELATED APPLICATIONS

This application is based on and claims priority under 35 U.S.C. §119 to Japanese Patent Application 2014-086858, filed on Apr. 18, 2014, the entire contents of which are incorporated herein by reference.

TECHNICAL FIELD

This disclosure relates to a vehicular seat slide device.

BACKGROUND DISCUSSION

In the related art, devices which are described in Japanese Patent No. 5411459 (Reference 1) and JP2009-90941A (Reference 2) are known as examples of a vehicular seat slide device. These devices are provided with a lower rail, an upper rail which is linked to be movable with respect to the lower rail, a resin nut which is fixed to the lower rail, and a screw rod which is pivotally supported by the upper rail. In addition, when the screw rod is rotated by an electric motor, the screw rod moves with respect to the nut. At this time, as the nut which is related to generation of a driving force in a moving direction is made of resin, it is assumed that generation of noise is suppressed. In addition, when the rotation of the screw rod is stopped, the movement of the screw rod is restricted at a position with respect to the nut at this time. According to this, a position of the upper rail with respect to the lower rail, that is, a position of a seat with respect to a vehicular floor is adjusted.

Incidentally, in Reference 1, by holding the resin nut with a metal cover, for example, strength with respect to a load in an axial line direction which is applied at a time of collision of a vehicle, that is, a load (hereinafter, referred to as a "collision load") of the upper rail in a moving direction, is ensured. However, it is necessary to ensure a sufficient length in the moving direction in order to ensure strength of a screw hole as the nut itself is made of resin.

Meanwhile, in Reference 2, the resin nut is formed being integrated with a metal case. However, it is also necessary to ensure a sufficient length in the moving direction in order to ensure the strength of the screw hole as the nut itself is made of resin.

Therefore, in any of Reference 1 and Reference 2, it is inevitable that the size of the rail in the moving direction increases, or that a range of adjustment of the rail in the moving direction decreases.

SUMMARY

Thus, a need exists for a vehicular seat slide device which is not suspectable to the drawback mentioned above.

An aspect of this disclosure is directed to a vehicular seat slide device, including: a first rail which is fixed to one of a vehicular floor and a seat; a second rail which is fixed to the other one of the floor and the seat, and is linked to be movable relative to the first rail; a screw rod which is supported by the second rail to be rotatable around an axial line which extends in a moving direction; a metal case which is fixed to the first rail, and through which the screw rod is inserted; a resin nut which is housed in the metal case in a state of being unmovable in the moving direction with respect to the metal case, and is screwed to the screw rod; and a metal nut which is housed in the metal case in a state of not being in contact with the resin nut in the moving direction, and is screwed to the screw rod.

BRIEF DESCRIPTION OF THE DRAWINGS

The foregoing and additional features and characteristics of this disclosure will become more apparent from the following detailed description considered with the reference to the accompanying drawings, wherein:

FIG. 1 is a side view of a seat in which an embodiment of this disclosure is employed;

FIG. 2 is a longitudinal cross-sectional view illustrating the same embodiment;

DETAILED DESCRIPTION

Figure 3:
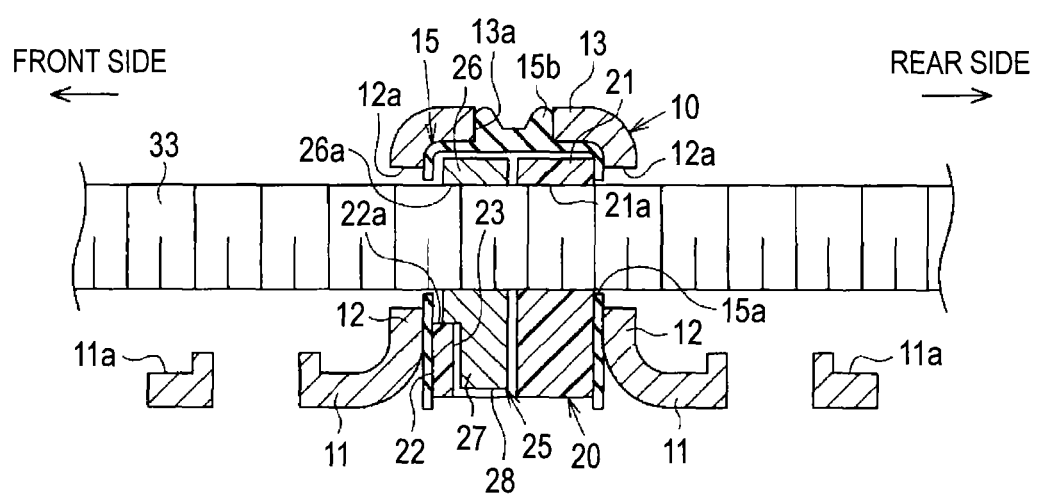
FIG. 3 is an enlarged view of FIG. 2.

Hereinafter, an embodiment of a vehicular seat slide device will be described. In addition, hereinafter, a vehicle longitudinal direction is referred to as a "longitudinal direction", and an upper side and a lower side in a vehicle height direction are respectively referred to as an "upper side" and a "lower side". In the embodiment, the longitudinal direction matches a longitudinal direction of a seat.

As illustrated in FIG. 1, a lower rail 2 which functions as a first rail is fixed to a floor 1 of a vehicle in a state of extending in the longitudinal direction, and an upper rail 3 which functions as a second rail is linked to the lower rail 2 to be movable in the longitudinal direction relative to the lower rail 2. In other words, as the lower rail 2 and the upper rail 3 have a substantially U-shaped rail cross section in which opening sides are butted to each other, and interpose a rolling element (not illustrated) which is disposed therebetween, the upper rail 3 is supported to be slidable in the longitudinal direction with respect to the lower rail 2.

In addition, the lower rail 2 and the upper rail 3 are installed as a pair in a width direction (a direction which is orthogonal to a paper surface in FIG. 1), and here, the lower rail 2 and the upper rail 3 which are disposed on a left side toward a front side (front side of a seat) are illustrated. In addition, a seat 5 which forms a sitting portion for an occupant is fixed to and supported by both upper rails 3. Therefore, by moving the upper rail 3 in the longitudinal direction with respect to the lower rail 2, the seat 5 moves in the longitudinal direction with respect to the floor 1.

As illustrated in FIG. 2, a metal case 10, which is made of, for example, a steel plate, is fastened to a bottom wall portion 2a which functions as a wall portion of the lower rail 2 that faces the upper rail 3 in the vehicle height direction. In other words, the metal case 10 includes one pair of attaching portions 11 which are disposed on the bottom wall portion 2a at a certain interval in the longitudinal direction, one pair of erected portions 12 which respectively extend upward (the vehicle height direction to be close to the upper rail 3) from tip ends that are close to each other in the longitudinal direction of both attaching portions 11, and a connecting portion 13 which connects upper ends (tip ends) of both erected portions 12 to each other in the longitudinal direction. In addition, the metal case 10 is fastened to the bottom wall portion 2a by one pair of fasteners 6 which respectively penetrate both attaching portions 11 in the vehicle height direction together with the bottom wall portion 2a. In addition, as enlarged and illustrated in FIG. 3, a substantially circular loose through hole 12a which penetrates in the longitudinal direction is formed in each erected portion 12, and a substantially circular guide hole 13a which penetrates in the vehicle height direction is formed in the connecting portion 13.

In the metal case 10, a buffer member 15, which is made of, for example, rubber, is housed. The buffer member 15 is formed in a shape of a substantially rectangular box which opens downward, and dimensions thereof in the longitudinal direction are set to be equivalent to a distance between both erected portions 12 in the longitudinal direction. The buffer member 15 is housed in the metal case 10 in a state of being adhered to both erected portions 12 in the longitudinal direction. In addition, in the buffer member 15, a through hole 15a which faces the loose through hole 12a and penetrates in the longitudinal direction is formed. In addition, in the buffer member 15, a substantially circular guide protrusion portion 15b which can be inserted into the guide hole 13a protrudes upward.

Figure 4:
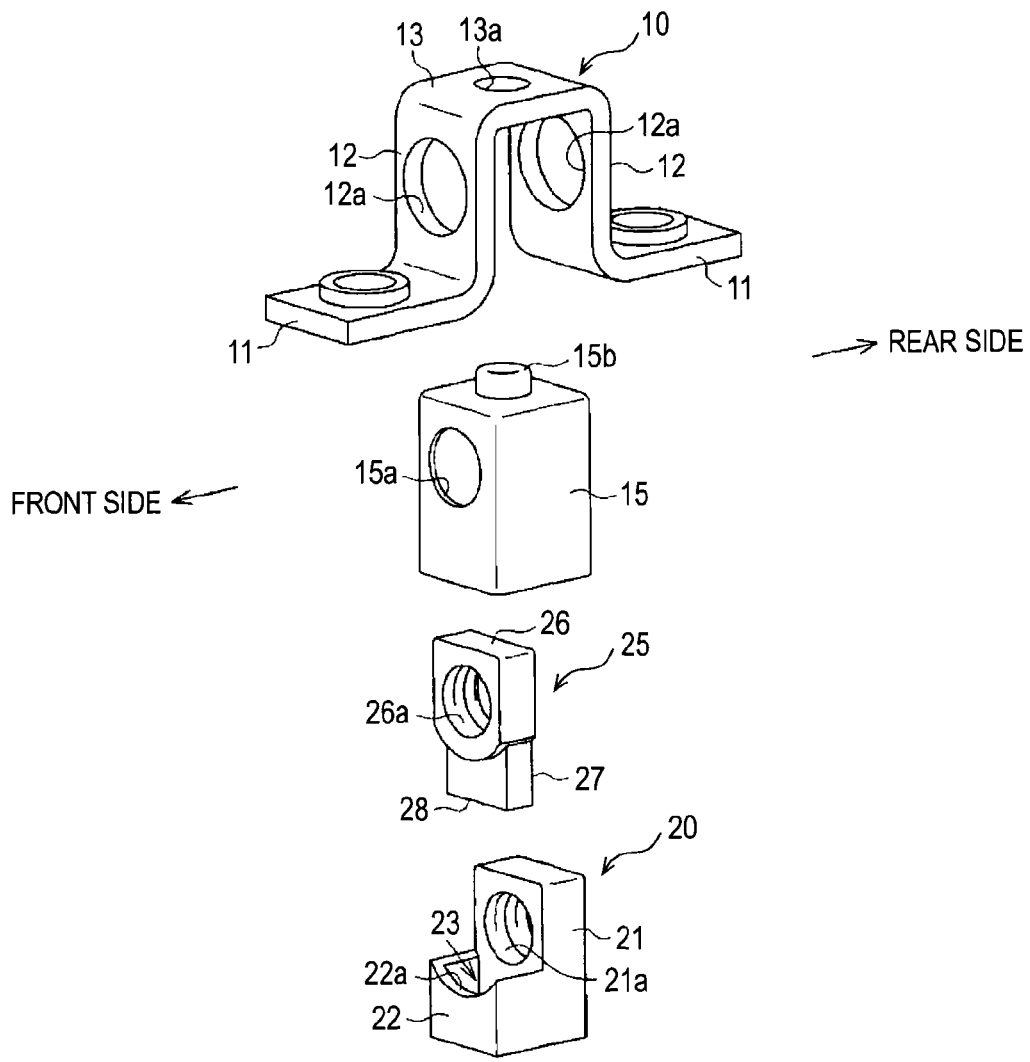
FIG. 4 is an exploded perspective view illustrating the embodiment.

In the buffer member 15, a resin nut 20 is housed. As illustrated together in FIG. 4, the resin nut 20 includes a nut portion 21 which has a shape of a substantially rectangular board, and a storage portion 22 which protrudes forward from a lower end of the nut portion 21. Dimensions of the resin nut 20 in the longitudinal direction are set to be equivalent to the distance between inner wall surfaces of the buffer member 15 in the longitudinal direction. Therefore, the resin nut 20 is adhered to both erected portions 12 via the buffer member 15 in the longitudinal direction, and is housed in the metal case 10 in a state of being unmovable in the longitudinal direction with respect to the metal case 10.

In the nut portion 21, a screw hole 21a which faces the through hole 15a above the storage portion 22 and penetrates in the longitudinal direction is formed.

The storage portion 22 is formed in a substantially U-shape which opens rearward, and forms a substantially rectangular cylindrical inserting portion 23 which opens in the vehicle height direction in cooperation with a front end surface of the nut portion 21. In addition, in a front wall portion of the storage portion 22, a recessed portion 22a which is recessed in a substantially curved shape downward from the upper end is formed.

In the inserting portion 23 of the resin nut 20, a metal nut 25 which is made of, for example, a steel material is mounted. In other words, inside the metal case 10, the resin nut 20 and the metal nut 25 are housed separately via the buffer member 15. The metal nut 25 includes a nut portion 26 in which a lower end surface that can abut against or can be close to an upper end surface of the storage portion 22 is formed, and a substantially rectangular board-shaped inserting piece 27 which extends downward from the nut portion 26 and is inserted into the inserting portion 23.

In the nut portion 26, a screw hole 26a which faces the screw hole 21a and penetrates in the longitudinal direction is formed. The dimensions (inner diameter, lead, and pitch) of the screw hole 26a are set to be equivalent to the dimensions of the screw hole 21a.

The dimensions of the inserting piece 27 in the longitudinal direction are set to be smaller than the width of an opening of the inserting portion 23 in the longitudinal direction. Therefore, the metal nut 25 can move in the longitudinal direction with respect to the resin nut 20 within a range of a difference in this dimensions or the like. In addition, as the inserting piece 27 is inserted into the inserting portion 23, rotation of the metal nut 25 with respect to the resin nut 20 around the screw hole 26a is restricted.

As illustrated in FIG. 2, in the upper rail 3, a front end portion and a rear end of a substantially round bar-shaped screw rod 33 which extends in an axial line in the longitudinal direction, are supported to be rotatable by bearing members 31 and 32 which are respectively mounted on the front end and the rear end above the bottom wall portion 2a. The screw rod 33 is made of, for example, a steel material, and is linked to a gear box 34 in the front end which penetrates the bearing member 31. The screw rod 33 is linked to be driven to an electric motor (not illustrated) via the gear box 34, and is rotatably driven by the electric motor.

In addition, the screw rod 33 is inserted into the metal case 10 or the like between both bearing members 31 and 32. As illustrated in FIG. 3, the screw rod 33 includes a screw portion which has the same outer diameter as the inner diameter of the screw holes 21a and 26a, and is screwed to the resin nut 20 and the metal nut 25 inside the metal case 10. At this time, as a posture (rotational position) with respect to the resin nut 20 is regulated in a state of being screwed to the screw rod 33, the metal nut 25 is basically in a state of not being in contact with the resin nut 20 in the longitudinal direction. In other words, when the screw rod 33 is screwed to the resin nut 20 and the metal nut 25 in a state where the inserting piece 27 of the metal nut 25 is inserted into the inserting portion 23 of the resin nut 20, the leads of the screw holes 21a and 26a are set to be in a state where the screwed members are in a non-contact state in the longitudinal direction.

In addition, as the resin nut 20 and the metal nut 25 are screwed to the screw rod 33, the positions of the resin nut 20 and the metal nut 25 in the vehicle height direction with respect to the metal case 10 (lower rail 2) are determined. At this time, in the vehicle height direction, a lower end 28 of the metal nut 25 which functions as a wall portion side end that is close to the bottom wall portion 2a is closer to the bottom wall portion 2a than a tip end surface 11a which faces the upper rail 3 of the attaching portion 11.

In addition, the position of the buffer member 15 in the vehicle height direction with respect to the metal case 10 (lower rail 2) is generally determined via the housed resin nut 20 and the metal nut 25. The buffer member 15 absorbs deviation of the center between the screw holes 21a and 26a, and the screw rod 33 in accordance with elastic deformation.

Next, effects of the embodiment will be described.

When the screw rod 33 is rotated by the electric motor, a driving force in the longitudinal direction is generated by an operation of the screw between the resin nut 20 which is unmovable in the longitudinal direction with respect to the metal case 10, and the screw rod 33. Accordingly, the screw rod 33 moves with respect to the resin nut 20 in the longitudinal direction, and the upper rail 3 moves with respect to the lower rail 2. In addition, the seat 5 moves in the longitudinal direction with respect to the floor 1. At this time, as the metal nut 25 is in a state of not being in contact with the resin nut 20 in the longitudinal direction, the metal nut 25 allows the screw rod 33 to revolve without generating a driving force in the longitudinal direction. In other words, as the screw rod 33 is substantially in an engaged relationship only with the resin nut 20 when rotating, generation of noise caused by the engagement between metals is suppressed. Meanwhile, when the rotation of the screw rod 33 is stopped, the movement of the screw rod 33 is restricted at a position with respect to the resin nut 20 in the longitudinal direction at this time. Accordingly, a position of the upper rail 3 with respect to the lower rail 2 in the longitudinal direction, that is, a position of the seat 5 in the longitudinal direction with respect to the floor 1, is adjusted.

Meanwhile, when a large collision load is applied, for example, by collision (frontal collision and rear collision) of the vehicle, the resin nut 20 is deformed and a load is applied to the metal nut 25. For this reason, the collision load is mainly received by the metal nut 25, and the screw rod 33 is held by the nut. Therefore, in all of the resin nuts 20 and the metal nuts 25, it is possible to ensure strength even when an increase in size in the longitudinal direction (moving direction of the upper rail 3) is prevented.

Figure 5:
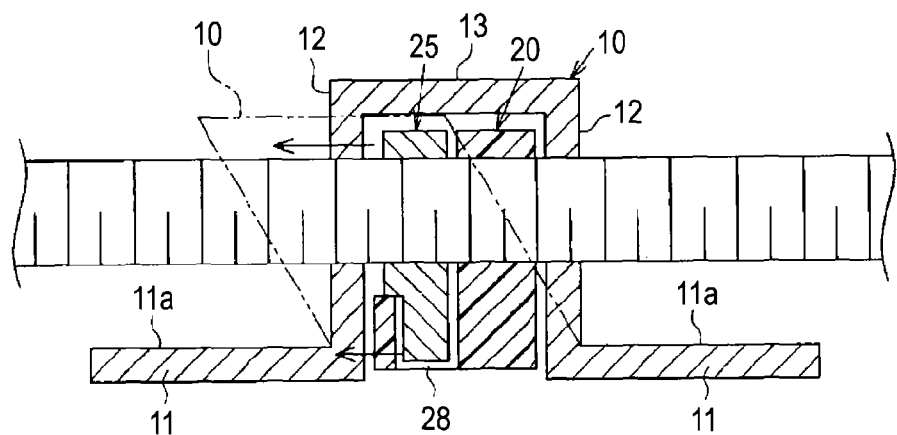
FIG. 5 is a schematic longitudinal cross-sectional view illustrating effects of the embodiment.

In particular, as schematically illustrated in FIG. 5, when the metal nut 25 which receives the collision load presses the erected portion 12 in the longitudinal direction, the erected portion 12 falls down starting from a part linking with the attaching portion 11. However, in the vehicle height direction, as the lower end 28 of the metal nut 25 is closer to the bottom wall portion 2a than the tip end surface 11a of the attaching portion 11, the metal nut 25 presses the attaching portion 11 in the longitudinal direction at the lower end 28. Therefore, it is possible to prevent the erected portion 12 from falling down as described above.

As described above, according to the embodiment, the effects as follows are obtained.

(1) In the embodiment, it is possible to ensure strength even when an increase in size of the nut (the resin nut 20 and the metal nut 25) which is screwed to the screw rod 33 in the moving direction is prevented. Accordingly, it is possible to suppress an increase in size of the lower rail 2 in the moving direction, or narrowing the range of adjustment of the upper rail 3 in the moving direction, that is, narrowing the range of the adjustment of the seat 5 with respect to the floor 1.

(2) In the embodiment, in the vehicle height direction, as the lower end 28 of the metal nut 25 is closer to the bottom wall portion 2a than the tip end surface 11a of the attaching portion 11, it is possible to prevent the erected portion 12 from falling down as described above even when the collision load is applied and the metal nut 25 presses the erected portion 12 in the longitudinal direction.

(3) In the embodiment, as the resin nut 20 which is related to the generation of the driving force in the longitudinal direction is adhered to both erected portions 12 of the metal case 10 via the buffer member 15 in the longitudinal direction, it is possible to suppress rattling in the longitudinal direction.

(4) In the embodiment, as the resin nut 20 and the metal nut 25 are separate from each other, for example, it is possible to avoid molding with high accuracy similarly to where the resin nut 20 and the metal nut 25 are formed being integrated with each other, and to reduce the number of manufacturing processes.

(5) In the embodiment, by forming the lower end surface of the nut portion 26 of the metal nut 25 to be abutted against or to be close to the upper end surface of the storage portion 22, for example, it is possible to prevent the metal nut 25 from falling out of the inserting portion 23 downward in a state of being temporarily assembled to the resin nut 20.

In addition, the above-described embodiment may be changed as follows.

Figure 6:
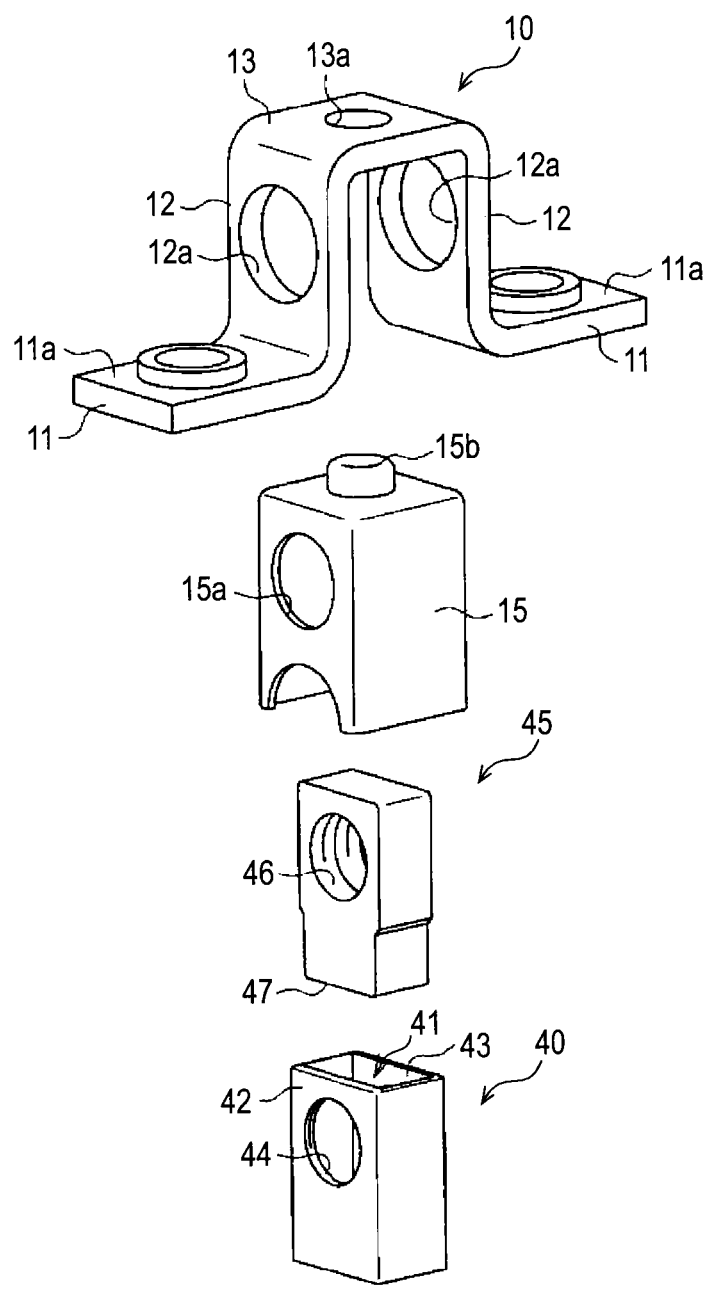
FIG. 6 is an exploded perspective view illustrating a modification example of this disclosure.

As illustrated in FIG. 6, a cylindrical resin nut 40 and a metal nut 45 which is inserted therethrough may be employed. In other words, the resin nut 40 which is housed in the buffer member 15 is formed in a substantially rectangular cylindrical shape which opens in the vehicle height direction, and the inner space thereof forms an inserting portion 41. The resin nut 40 is adhered to both erected portions 12 in the longitudinal direction via the buffer member 15 in a front wall portion 42 and a rear wall portion 43, and is housed in the metal case 10 in a state of being unmovable in the longitudinal direction with respect to the metal case 10. In addition, in upper end portions of the front wall portion 42 and the rear wall portion 43, screw holes 44 which face the through hole 15a of the buffer member 15 and penetrate in the longitudinal direction are respectively formed. The inner diameter of the screw hole 44 is set to be equivalent to the outer diameter of the screw portion of the screw rod 33. It is needless to say that the position of the resin nut 40 in the vehicle height direction with respect to the metal case 10 (lower rail 2) is determined as the resin nut 40 is screwed to the screw rod 33.

The metal nut 45 is made of, for example, a steel material, and is inserted into the inserting portion 41 of the resin nut 40. In other words, inside the metal case 10, the resin nut 40 and the metal nut 45 are housed separately via the buffer member 15. In addition, in an upper end portion of the metal nut 45, a screw hole 46 which faces the screw hole 44 and penetrates in the longitudinal direction is formed. The dimensions (inner diameter, lead, and pitch) of the screw hole 46 are set to be equivalent to the dimensions of the screw hole 44. It is needless to say that the position of the metal nut 45 in the vehicle height direction with respect to the metal case 10 (lower rail 2) is determined as the metal nut 45 screwed to the screw rod 33. At this time, in the vehicle height direction, a lower end 47 of the metal nut 45 which functions as the wall portion side end that is close to the bottom wall portion 2a is closer to the bottom wall portion 2a than the tip end surface 11a which faces the upper rail 3 of the attaching portion 11.

The dimensions of the metal nut 45 in the longitudinal direction is set to be smaller than the width of the opening of the inserting portion 41 in the longitudinal direction. Therefore, the metal nut 45 can move in the longitudinal direction with respect to the resin nut 40 within the range of a difference in the dimensions or the like. However, when the screw rod 33 is screwed into the resin nut 40 and the metal nut 45 in a state where the metal nut 45 is inserted into the inserting portion 41 of the resin nut 40, the leads of the screw holes 44 and 46 are set to be in a state where the screwed members are in a non-contact state in the longitudinal direction. In addition, as the metal nut 45 is inserted into the inserting portion 41, the rotation around the screw hole 46 with respect to the resin nut 40 is restricted.

Therefore, the effects that are similar to (1) to (4) in the above-described embodiment are obtained even when a change is employed in this manner. In addition, inside the resin nut 40, an appropriate step which can be abutted against or be close to the lower end surface of the metal nut 45 may be formed. In this case, an effect which is similar to (5) of the above-described embodiment is obtained.

In the above-described embodiment, the positional relationships between the resin nut 20 and the metal nut 25 in the longitudinal direction inside the metal case 10 may be mutually reversed. In other words, the nut portion 21 of the resin nut 20 may be disposed in front of the metal nut 25 (and the storage portion 22).

In the above-described embodiment, the lower end 28 (47) of the metal nut 25 (45) may not be closer to the bottom wall portion 2a than the tip end surface 11a of the attaching portion 11.

In the above-described embodiment, the shape of the metal case 10 is an example. For example, by omitting both attaching portions 11, the lower ends of both erected portions 12 may be fixed to the bottom wall portion 2a by welding or the like. Otherwise, the shape of the metal case 10 may be a shape of a box which can surround all sides of the buffer member 15 (the resin nut 20 and the metal nut 25).

In the above-described embodiment, the metal case 10, the metal nuts 25 and 45, and the screw rod 33 may be made of metal, other than steel.

In the above-described embodiment, the buffer member 15 may be omitted.

In the above-described embodiment, the positional relationships between the lower rail 2 and the upper rail 3, and the metal case 10 or the like and the screw rod 33 or the like may be mutually reversed. In other words, both attaching portions 11 of the metal case 10 which houses the resin nut 20 (40) and the metal nut 25 (45) are fastened to a lid wall portion 3a (refer to FIG. 2) which functions as the wall portion of the upper rail 3 that faces the lower rail 2 in the vehicle height direction. In addition, the screw rod 33 is supported to be rotatable by the lower rail 2. The effects which are similar to those in the above-described embodiment are obtained even when there is a change in this manner.

In the above-described embodiment, the extending direction of the lower rail 2 and the upper rail 3 may not match the longitudinal direction. For example, the lower rail 2 and the upper rail 3 may extend in a vehicle width direction. In this case, the collision load that the metal nut 25 (45) receives becomes a load in a case of side collision.

In the above-described embodiment, the extending direction of the lower rail 2 and the upper rail 3 may not match the longitudinal direction of the seat. For example, with respect to the lower rail 2 and the upper rail 3 which extend in the longitudinal direction, the longitudinal direction of the seat may match the vehicle width direction.

An aspect of this disclosure is directed to a vehicular seat slide device, including: a first rail which is fixed to one of a vehicular floor and a seat; a second rail which is fixed to the other one of the floor and the seat, and is linked to be movable relative to the first rail; a screw rod which is supported by the second rail to be rotatable around an axial line which extends in a moving direction; a metal case which is fixed to the first rail, and through which the screw rod is inserted; a resin nut which is housed in the metal case in a state of being unmovable in the moving direction with respect to the metal case, and is screwed to the screw rod; and a metal nut which is housed in the metal case in a state of not being in contact with the resin nut in the moving direction, and is screwed to the screw rod.

According to this configuration, when the screw rod is rotated, in general, a driving force is generated by an operation of a screw between the resin nut which is unmovable in the moving direction with respect to the metal case, and the screw rod. Accordingly, the screw rod moves with respect to the resin nut, and the second rail moves with respect to the first rail. At this time, as the metal nut is in a state of not being in contact with the resin nut in the moving direction, the metal nut allows the screw rod to revolve without generating a driving force. In other words, as the screw rod is substantially in an engaged relationship only with the resin nut when rotating, generation of noise is suppressed. Meanwhile, when a collision load is applied, the resin nut is deformed and a load is applied to the metal nut. For this reason, the collision load is mainly received by the metal nut, and the screw rod is held by the nut. Therefore, in all of the resin nuts and the metal nuts, it is possible to ensure strength even while an increase in size in the moving direction is suppressed.

In the vehicular seat slide device according to the aspect of this disclosure, it is preferable that the metal case includes one pair of attaching portions which are fixed with a certain interval therebetween in the moving direction to a wall portion of the first rail which faces the second rail in a vehicle height direction, one pair of erected portions which respectively extend in the vehicle height direction to be close to the second rail from tip ends that are close to each other in the moving direction of both attaching portions, and a connecting portion which connects the tip ends of both erected portions to each other in the moving direction, the screw rod is inserted into both erected portions, and, in the vehicle height direction, a wall portion side end which is close to the wall portion of the metal nut is closer to the wall portion than the tip end surface which faces the second rail of the attaching portion.

According to this configuration, when the collision load is applied and the metal nut presses the erected portion in the moving direction, the erected portion falls down starting from a part linking with the attaching portion. However, in the vehicle height direction, if the wall portion side end of the metal nut is closer to the wall portion than the tip end surface of the attaching portion, the metal nut presses the attaching portion in the moving direction at the wall portion side end. Therefore, it is possible to suppress the above-described falling down of the erected portion.

The aspect of this disclosure has an effect that it is possible to ensure strength even while an increase in size of the nut which is screwed to the screw rod is suppressed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicular seat slide device, comprising:
a first rail which is fixed to one of a vehicular floor and a seat;
a second rail which is fixed to the other one of the floor and the seat, and is linked to be movable relative to the first rail;
a screw rod which is supported by the second rail to be rotatable around an axial line which extends in a moving direction;
a metal case which is fixed to the first rail, and through which the screw rod is inserted;
a resin nut which is housed in the metal case in a state of being unmovable in the moving direction with respect to the metal case, and is screwed to the screw rod; and
a metal nut which is housed in the metal case in a state of not being in contact with the resin nut in the moving direction, and is screwed to the screw rod,
wherein a clearance is provided between the resin nut and the metal nut in the moving direction of the second rail
wherein the metal case includes one pair of attaching portions which are fixed at a certain interval in the moving direction to a wall portion of the first rail which faces the second rail in a vehicle height direction, one pair of erected portions which respectively extend in the vehicle height direction to be close to the second rail from tip ends that are close to each other in the moving direction of both attaching portions, and a connecting portion which connects the tip ends of both erected portions to each other in the moving direction, wherein the screw rod is inserted into both erected portions, wherein, in the vehicle height direction, a wall portion side end of the metal nut which approaches the wall portion is closer to the wall portion than the tip end surface which faces the second rail of the attaching portion, wherein the resin nut includes a nut portion that is screwed to the screw rod and a storage portion with a substantially U-shape that extends from the nut portion and abuts a buffer member on a side distal to the nut portion, and wherein the storage portion forms an insertion portion into which the metal nut is inserted so that the clearance is between the nut portion and the metal nut.

2. The vehicular seat slide device according to claim 1, further comprising:

a buffer member housed in the metal case, the resin nut and the metal nut being housed within the buffer member.

* * * * *